United States Patent
Koike et al.

(10) Patent No.: US 11,604,488 B2
(45) Date of Patent: Mar. 14, 2023

(54) INPUT DEVICE

(71) Applicant: Alps Alpine Co., Ltd., Tokyo (JP)

(72) Inventors: Asuka Koike, Miyagi-ken (JP);
Takeaki Maehata, Miyagi-ken (JP);
Ryuichiro Yasuhara, Miyagi-ken (JP);
Kazunari Takahashi, Miyagi-ken (JP);
Atsushi Goto, Miyagi-ken (JP)

(73) Assignee: Alps Alpine Co., Ltd.

( * ) Notice: Subject to any disclaimer, the term of this patent is extended or adjusted under 35 U.S.C. 154(b) by 357 days.

(21) Appl. No.: 16/912,311

(22) Filed: Jun. 25, 2020

(65) Prior Publication Data
US 2020/0326746 A1 Oct. 15, 2020

Related U.S. Application Data

(63) Continuation of application No. PCT/JP2018/047076, filed on Dec. 20, 2018.

(30) Foreign Application Priority Data

Dec. 28, 2017 (JP) .............................. JP2017-254302

(51) Int. Cl.
*G05G 5/26* (2006.01)
*F16D 57/00* (2006.01)
(Continued)

(52) U.S. Cl.
CPC .............. *G05G 5/26* (2013.01); *F16D 57/002* (2013.01); *G05G 1/08* (2013.01); *G05G 5/03* (2013.01); *G05G 2505/00* (2013.01)

(58) Field of Classification Search
CPC ............ F16D 57/002; G05G 5/26; G05G 5/03
See application file for complete search history.

(56) References Cited

U.S. PATENT DOCUMENTS 4,745,823 A * 5/1988 Morita .................... F16H 55/18
74/440
6,320,487 B1 * 11/2001 Miller ...................... G05G 1/08
335/274

(Continued)

FOREIGN PATENT DOCUMENTS

CN 2012-73350 Y 7/2009
EP 3144766 A1 3/2017
(Continued)

*Primary Examiner* — Daniel D Yabut
(74) *Attorney, Agent, or Firm* — Harness, Dickey & Pierce, P.L.C.

(57) ABSTRACT

An input device includes a fixed unit, a rotary member rotatably supported by the fixed unit, a rotation-detecting unit that detects a rotation angle of the rotary member, a brake-applying unit that applies a braking force to the rotary member, a torque-applying unit that applies a driving torque to the rotary member, and a control unit that controls the brake-applying unit and the torque-applying unit. The brake-applying unit includes magnetorheological fluid, a brake-applying coil that applies a magnetic field to the magnetorheological fluid, a shaft to which braking torque that changes with viscosity of the magnetorheological fluid is applied, and a transmission gear provided on the shaft and that is in mesh with a gear provided on the rotary member. The shaft is positioned on an outer side with respect to the rotary member in a radial direction of the rotary member.

8 Claims, 13 Drawing Sheets

(51) Int. Cl.
 *G05G 5/03* (2008.04)
 *G05G 1/08* (2006.01)

(56) References Cited

U.S. PATENT DOCUMENTS

| | | | |
|---|---|---|---|
| 6,339,419 | B1 | 1/2002 | Jolly et al. |
| 6,480,752 | B1 * | 11/2002 | Blume ................... B60K 37/06 700/56 |
| 2007/0267283 | A1 * | 11/2007 | Hiroe ....................... H01H 5/02 200/179 |
| 2011/0181405 | A1 | 7/2011 | Periquet et al. |
| 2018/0038478 | A1 | 2/2018 | Arakawa et al. |
| 2018/0284891 | A1 | 10/2018 | Eck et al. |
| 2019/0317544 | A1 * | 10/2019 | Ravedati .................. G05G 5/03 |

FOREIGN PATENT DOCUMENTS

| | | | |
|---|---|---|---|
| FR | 3042046 | A1 | 4/2017 |
| JP | 2002-529845 | A | 9/2002 |
| JP | 2014-149857 | A | 8/2014 |
| JP | 2014-181778 | A | 9/2014 |
| JP | 2015008593 | A * | 1/2015 |
| WO | 2017-022160 | A1 | 2/2017 |
| WO | 2017-060330 | A1 | 4/2017 |

* cited by examiner

FIG. 7A
FIG. 7B
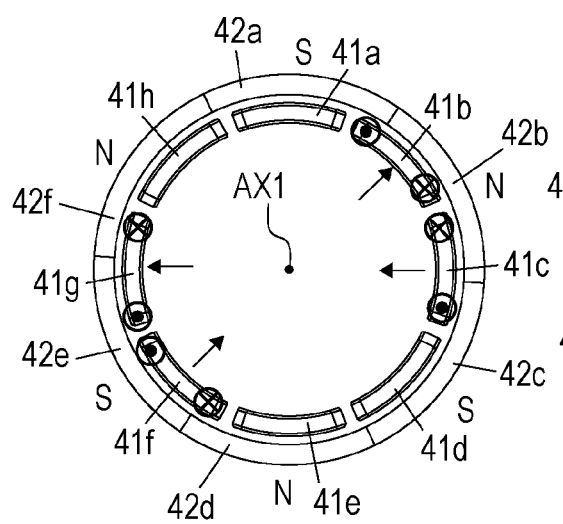
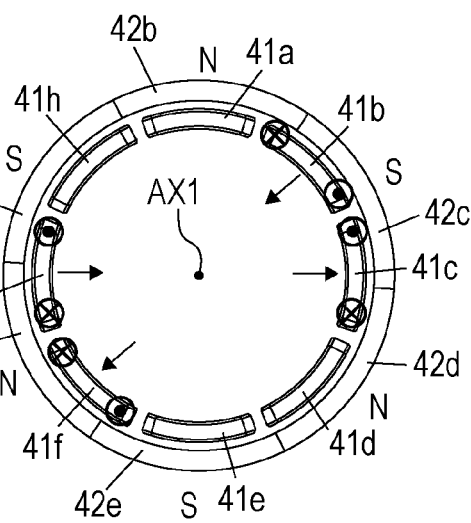
FIG. 7C
FIG. 7D
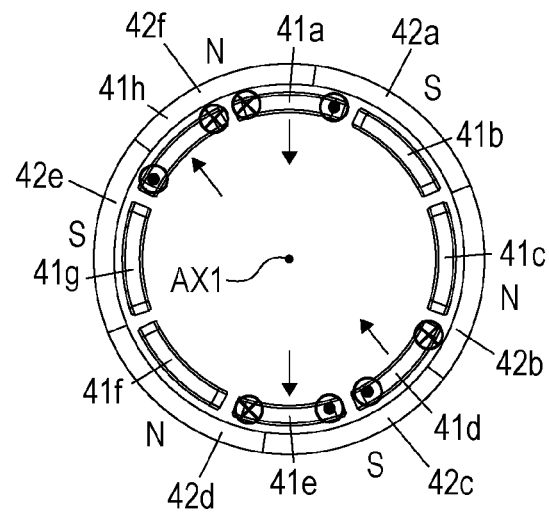
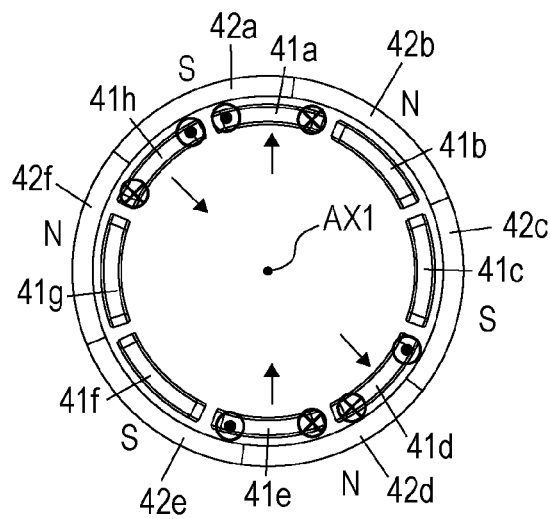

INPUT DEVICE

CROSS REFERENCE TO RELATED APPLICATIONS

This application is a Continuation of International Application No. PCT/JP2018/047076 filed on Dec. 20, 2018, which claims benefit of Japanese Patent Application No. 2017-254302 filed on Dec. 28, 2017. The entire contents of each application noted above are hereby incorporated by reference.

BACKGROUND OF THE INVENTION

1. Field of the Invention

The present invention relates to an input device capable of changing the rotational resistance by using magnetorheological fluid.

2. Description of the Related Art

A force-sense-applying input device disclosed by PTL 1 includes a knob to be rotated manually; a rotary encoder that detects the rotation angle of the knob and outputs a rotation-angle signal corresponding to the rotation angle; a motor capable of applying a rotational force to the knob; an electromagnetic brake capable of preventing the rotation of the knob; a strain gauge that detects the rotation direction of an operating force applied to the knob in a state where the rotation of the knob is prevented by the electromagnetic brake, the strain gauge outputting a rotation-direction signal corresponding to the rotation direction; and a controller that controls the motor and the electromagnetic brake in accordance with the rotation-angle signal and the rotation-direction signal. Thus, a force-sense-applying input device exhibiting excellent operability in unlocking the knob is provided.

However, in the input device disclosed by PTL 1, since the strain gauge is attached to the circumferential side surface of a drive shaft that connects the knob and the electromagnetic brake to each other, wires for extracting the signal from the strain gauge need to be laid inside a rotary mechanism including the knob, the electromagnetic brake, and the motor. Therefore, the wire arrangement and the configuration of the rotary mechanism tend to be complicated. Moreover, the presence of the wires may impose some restrictions on the rotation angle of the knob and so forth. Furthermore, size reduction of the input device in a direction of the drive shaft is difficult.

SUMMARY OF THE INVENTION

The present invention provides an input device including a rotary mechanism having no wires thereinside, realizing a simple configuration of the rotary mechanism and a size reduction in a drive-axis direction.

To solve the above problems, an input device according to the present invention includes a fixed unit, a rotary member rotatably supported by the fixed unit, a rotation-detecting unit that detects a rotation angle of the rotary member, a brake-applying unit that applies a braking force to the rotary member, a torque-applying unit that applies a driving torque to the rotary member, and a control unit that controls the brake-applying unit and the torque-applying unit. The brake-applying unit includes magnetorheological fluid, a brake-applying coil that applies a magnetic field to the magnetorheological fluid, a shaft to which braking torque that changes with viscosity of the magnetorheological fluid is applied, and a transmission gear provided on the shaft, the transmission gear being in mesh with a gear provided on the rotary member. The shaft is positioned on an outer side with respect to the rotary member in a radial direction of the rotary member.

In such a configuration, no wires need to be provided inside a rotary mechanism including the rotary member and the torque-applying unit. Therefore, the configuration of the rotary mechanism can be simplified, realizing an input device whose size can be reduced in the direction of the drive axis (rotation axis) of the rotary member.

In the input device according to the present invention, it is preferable that the fixed unit be made of a non-magnetic material and include a cylindrical supporting portion extending in a direction of a rotation axis of the rotary member; the torque-applying unit include a plurality of torque-applying coils arranged in a circumferential direction of an outer circumferential surface of the supporting portion, and a magnet that faces the plurality of torque-applying coils with an interval, the magnet being annular and provided on an outer side with respect to the plurality of torque-applying coils; the magnet be positioned on an inner side with respect to the rotary member and rotate along with the rotary member; and the control unit control current to be supplied to the plurality of torque-applying coils, the current being controlled in accordance with a rotation angle of the rotary member detected by the rotation-detecting unit.

In such a configuration, when the current to be supplied to the torque-applying coils is controlled, a driving torque can be applied to the rotary member. Furthermore, since the torque-applying coils are held by the non-magnetic supporting portion, the change in the magnetic attraction that occurs with the change in the relative position of the magnet can be reduced.

In the input device according to the present invention, it is preferable that the brake-applying unit include a rotary plate connected to the shaft, and a yoke that induces the magnetic field generated by the brake-applying coils; the yoke face one side of the rotary plate and another side of the rotary plate with respective gaps in between such that the magnetic field passes through the rotary plate from the one side to the other side; the magnetorheological fluid be provided in the gaps; and the control unit control current to be supplied to the brake-applying coils, the current being controlled in accordance with a rotation angle of the rotary member.

In such a configuration, not only the variable control of the driving torque generated by the torque-applying unit but also the variable control of the braking force to a desired level is realized. Therefore, various tactile senses of operation can be given to an operator who operates the rotary member.

In the input device according to the present invention, it is preferable that the gear include a first gear and a second gear; the first gear be fixed to the rotary member; and the second gear have teeth arranged at a pitch equal to a pitch of teeth of the first gear, the second gear being urged in a circumferential direction such that the pitches are staggered.

In such a configuration, backlash at the removal of the braking force applied to the rotary member or in any other like situation can be reduced.

It is preferable that the input device according to the present invention further include a frame that connects the fixed unit and the brake-applying unit to each other, and a strain gauge that detects strain occurring in the frame.

In such a configuration, the braking force applied to the rotary member can be removed in accordance with the result of the detection by the strain gauge.

BRIEF DESCRIPTION OF THE DRAWINGS

FIGS. 7A to 7D are plan views each illustrating a relationship between air-core coils of a coil portion and magnets of a magnet portion;

DESCRIPTION OF THE PREFERRED EMBODIMENTS

An input device according to an embodiment of the present invention will now be described in detail with reference to the drawings.

Figure 1A:
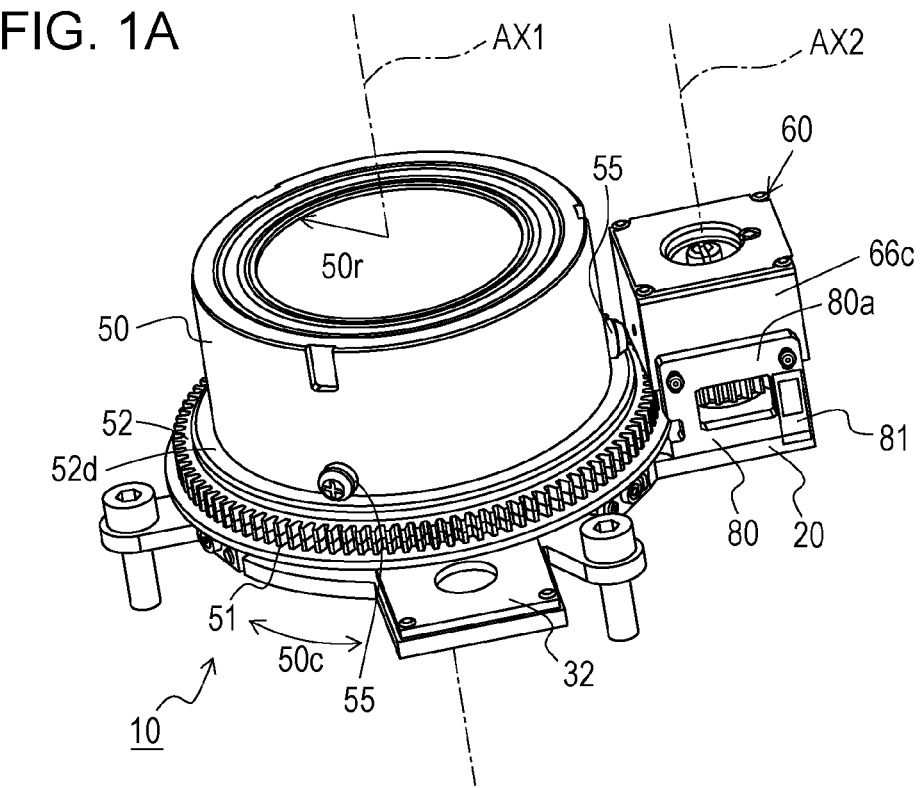
FIGS. 1A and 1B are perspective views illustrating a configuration of an input device according to an embodiment of the present invention.
Figure 1B:
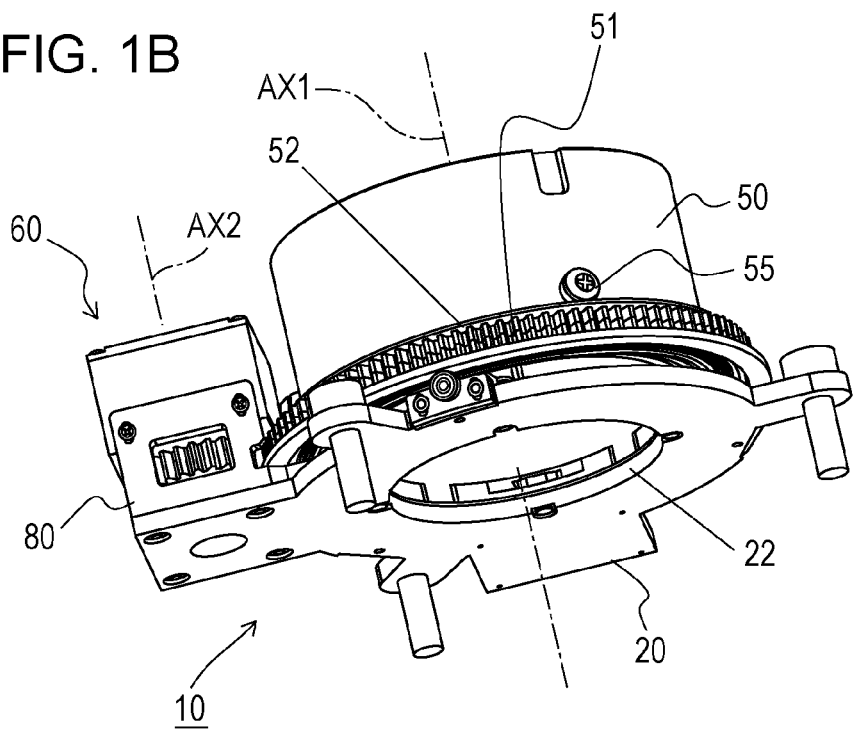
Figure 2:
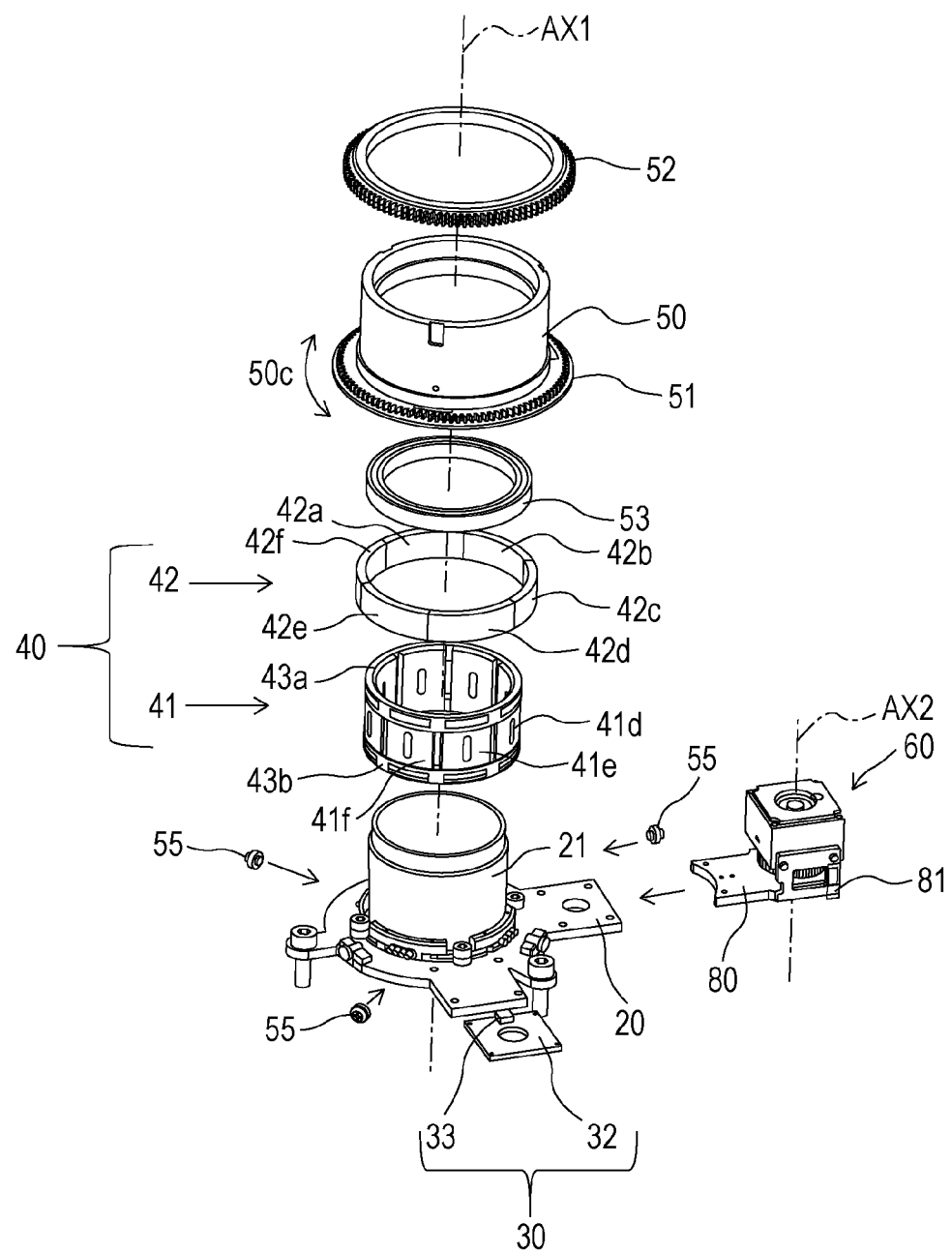
FIG. 2 is an exploded perspective view of the input device illustrated in FIGS. 1A and 1B.
Figure 3:
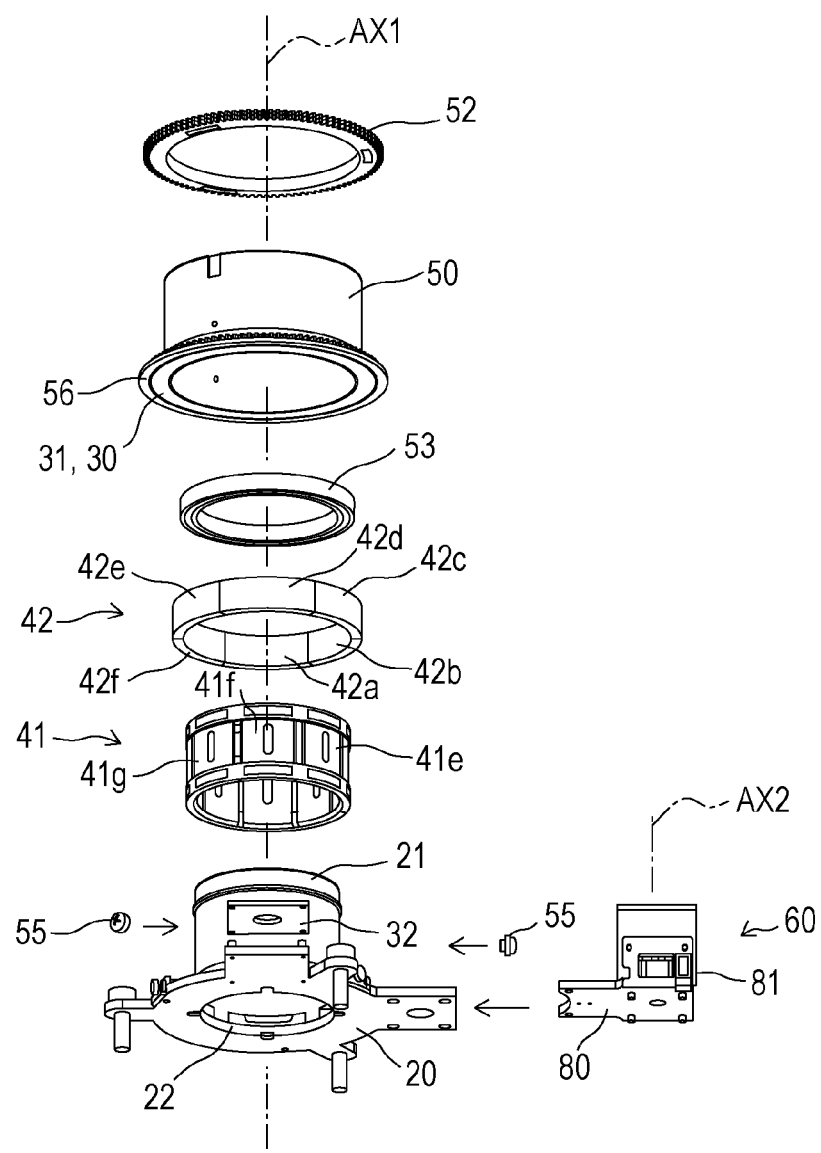
FIG. 3 is another exploded perspective view of the input device illustrated in FIGS. 1A and 1B.
Figure 4:
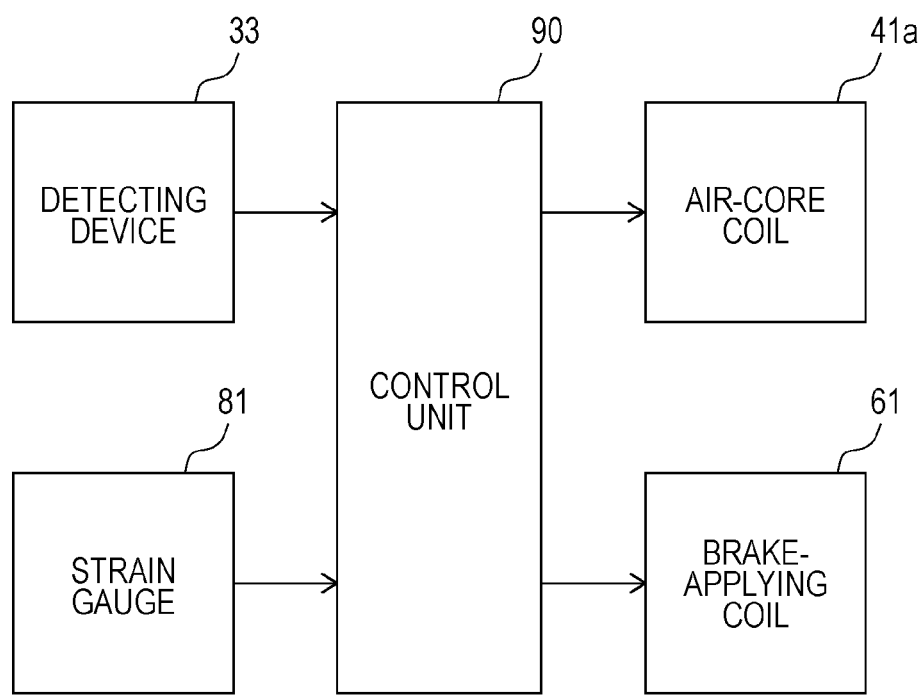
FIG. 4 is a functional block diagram of the input device illustrated in FIGS. 1A and 1B.
Figure 5:
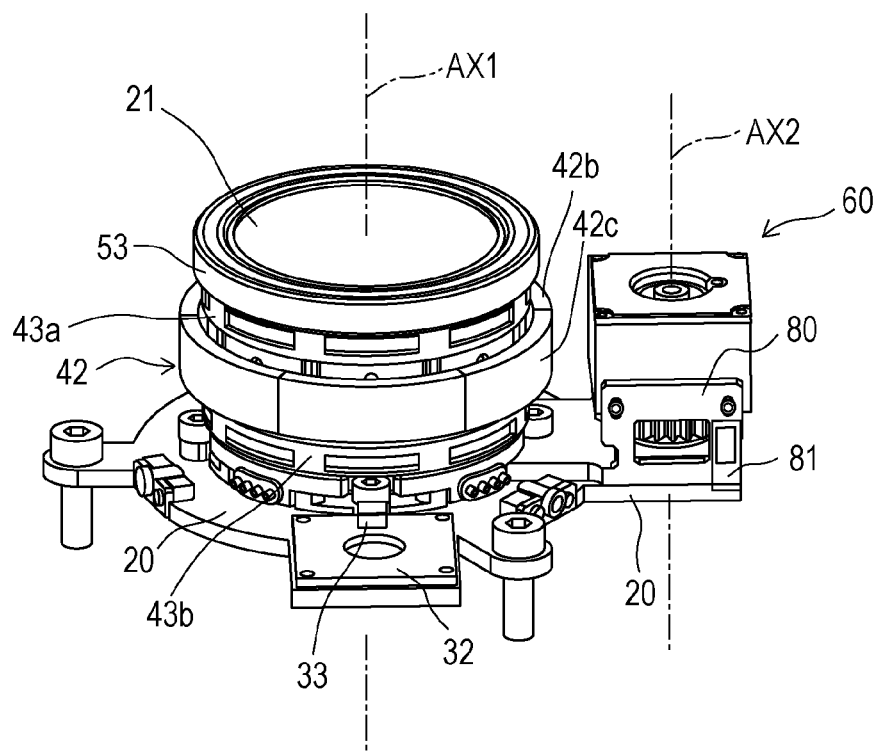
FIG. 5 is a perspective view of the input device, with a rotary member, a first gear, and a second gear not illustrated.
Figure 6:
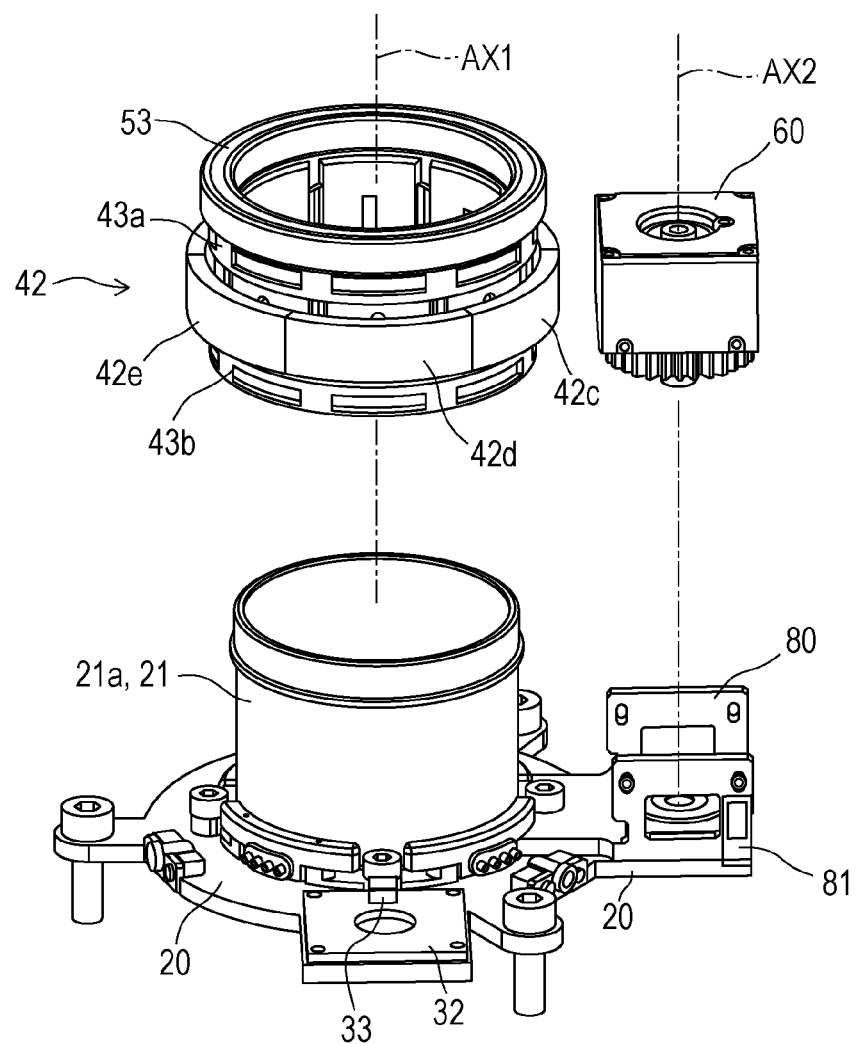
FIG. 6 is an exploded perspective view of the input device illustrated in FIG. 5.

FIGS. 1A and 1B are perspective views illustrating a configuration of an input device 10 according to an embodiment of the present invention. FIGS. 2 and 3 are exploded perspective views of the input device 10 illustrated in FIGS. 1A and 1B. FIG. 4 is a functional block diagram of the input device 10. FIG. 5 is a perspective view of the input device 10, with a rotary member 50, a first gear 51, and a second gear 52 not illustrated. FIG. 6 is an exploded perspective view of the input device 10 in the state illustrated in FIG. 5.

As illustrated in FIG. 2, the input device 10 according to the present embodiment includes a fixed unit 20, a rotation-detecting unit 30, a torque-applying unit 40, the rotary member 50, a gear preferably including the first gear 51 and the second gear 52, a brake-applying unit 60, and preferably a frame 80 and a strain gauge 81, all of which are assembled as illustrated in FIGS. 1A and 1B for use. The input device 10 further includes a control unit 90 illustrated in FIG. 4.

Fixed Unit

The fixed unit 20 is a plate member and is preferably made of a non-magnetic material. Preferably, as illustrated in FIGS. 2 and 3, a cylindrical supporting portion 21 is provided on the fixed unit 20. The fixed unit 20 has an opening 22 (FIGS. 1 and 3) vertically passing therethrough in an area corresponding to a hollow part of the supporting portion 21. The supporting portion 21 is made of a non-magnetic material and extends coaxially with a rotation axis AX1 (a drive axis) of the rotary member 50.

Torque-Applying Unit

As illustrated in FIG. 2, the torque-applying unit 40 preferably includes a coil portion 41, a magnet portion 42, and coil holders 43a and 43b.

The coil portion 41 preferably includes eight torque-applying coils (air-core coils 41a, 41b, 41c, 41d, 41e, 41f, 41g, and 41h) (see FIGS. 7A to 7D) provided on the outer side with respect to the supporting portion 21 and arranged in the circumferential direction of an outer circumferential surface 21a (see FIG. 6) of the supporting portion 21. The eight air-core coils 41a to 41h are arranged at regular angular intervals on a circle centered at the rotation axis AX1 and are each coiled around a line extending in a radial direction from the rotation axis AX1 toward the circumference of the circle. The air-core coils 41a to 41h are each supplied with current from the control unit 90 (see FIG. 4).

FIGS. 7A to 7D are plan views each illustrating a relationship between the air-core coils 41a to 41h of the coil portion 41 and magnets 42a to 42f of the magnet portion 42. FIGS. 7A to 7D each illustrate a position where the magnets 42a to 42f are stabilized at the switching of the current supplied to the air-core coils 41a to 41h, that is, a position where a maximum torque is generated. FIGS. 7A to 7D each also illustrate vertical directions (directions along the rotation axis AX1) of the current supplied to the air-core coils 41a to 41h, with a symbol "x" representing a direction out of the plane of the page and a symbol "•" (black dot) representing a direction into the plane of the page.

As illustrated in FIGS. 1, 5, and 6, the eight air-core coils 41a to 41h are positioned and held by the two coil holders 43a and 43b. The two coil holders 43a and 43b each have a ring shape and are spaced apart from each other by a predetermined distance in the vertical direction. The upper ends and the lower ends of the air-core coils 41a to 41h are fixed to the inner circumferential surfaces of the coil holders 43a and 43b. The lower coil holder 43b is fixed to the fixed unit 20. Therefore, as illustrated in FIG. 5, the lower coil holder 43b is positioned on the outer side with respect to the supporting portion 21. The position of the lower coil holder 43b is on the inner side with respect to an area where an encoder disc 31, to be described below, is positioned.

As illustrated in FIGS. 7A to 7D, current is supplied to a total of four coils (a single set of coils), specifically a pair of adjacent air-core coils and another pair of adjacent coils positioned symmetrically to the former pair of air-core coils about the rotation axis AX1.

A state illustrated in FIGS. 7A and 7B where the current is supplied to one set of coils, namely a pair of adjacent air-core coils 41b and 41c and another pair of air-core coils 41f and 41g positioned symmetrically thereto about the rotation axis AX1, is defined as A-phase. A state illustrated in FIGS. 7C and 7D where the current is supplied to another set of coils that are not supplied with current in the A-phase, namely a pair of adjacent air-core coils 41h and 41a and another pair of air-core coils 41d and 41e positioned symmetrically thereto about the rotation axis AX1, is defined as B-phase. Note that the four coils included in each set are connected in series. That is, the four air-core coils 41b, 41c, 41f, and 41g in the A-phase are connected in series, and the four air-core coils 41h, 41a, 41d, and 41e in the B-phase are also connected in series.

Preferably, the way the current is supplied to the air-core coils 41a to 41h is controlled to be switched between those for the two phases, i.e. the A-phase and the B-phase, every time the rotary member 50 as an operating portion rotates by 120 degrees. While the rotary member 50 undergoes one revolution, the way of current supply is switched three times and by 120 degrees at a time among the states illustrated in FIGS. 7A to 7D.

In the state illustrated in FIG. 7A, the current flows in opposite directions in the two adjacent air-core coils 41b and 41c. Furthermore, the direction of the current in the air-core coil 41f positioned symmetrically to the air-core coil 41b about the rotation axis AX1 is the same as that in the air-core coil 41b. Furthermore, the direction of the current in the air-core coil 41g positioned symmetrically to the air-core coil 41c is the same as that in the air-core coil 41c. Hence, as illustrated by arrows in FIG. 7A, two adjacent coils generate magnetic fields acting in opposite directions, and two coils positioned symmetrically to each other about the rotation axis AX1 generate magnetic fields acting in the same direction.

The above relationship between the way of current supply to the air-core coils and the generation of magnetic fields also applies to the states illustrated in FIGS. 7B, 7C, and 7D.

As illustrated in FIGS. 2, 3, and 7, the magnet portion 42 includes six magnets 42a, 42b, 42c, 42d, 42e, and 42f. Preferably, the magnets 42a to 42f face the air-core coils 41a to 41h of the coil portion 41 with a predetermined interval in the radial direction and on the outer side with respect thereto. The magnets 42a to 42f are arranged at regular angular intervals on a circle centered at the rotation axis AX1, with magnetic poles of each of the magnets 42a to 42f being aligned in the radial direction from the rotation axis AX1 toward the circumference of the circle. The positions of the magnetic poles are inverted between adjacent ones of the magnets. In FIGS. 7A to 7D, for simplicity, only the magnetic poles on the outer side are denoted. For example, in the magnet 42a, the south pole is positioned on the outer side, and the north pole is positioned on the inner side, which is nearer to the rotation axis AX1.

In such a configuration, the current is supplied to the air-core coils to establish the four patterns illustrated in FIGS. 7A to 7D, whereby the magnet portion 42 can be rotated or turned relative to the coil portion 41, which is fixed to the fixed unit 20, about the rotation axis AX1. Accordingly, the rotary member 50 to which the magnet portion 42 is fixed is also rotated or turned. The direction of driving torque for the rotation is controlled in accordance with the direction of the current to be supplied to establish the four patterns illustrated in FIGS. 7A to 7D. If the direction of the current supplied to establish the four patterns is entirely inverted, a driving torque for reverse rotation is generated, causing the rotary member 50 to rotate or turn in the reverse direction. Furthermore, if the level of the current to be supplied to the air-core coils is controlled by the control unit 90, a driving torque at an arbitrary magnitude can be applied to the rotary member 50. Furthermore, the change in the driving torque that occurs with the change in the positions of the air-core coils and the magnets relative to each other can be reduced. Therefore, a predetermined tactile sense of operation can be given to an operator who operates the rotary member 50.

On the other hand, if magnetic cores or salient magnetic poles facing magnets are provided as in a typical motor, magnetic attraction occurs between the magnets and the magnetic members. Therefore, even in a rotating operation with no current supplied to the coils, cogging torque, i.e. torque fluctuation characteristic to a magnetic circuit, occurs.

In contrast, the present embodiment employs air-core coils with no magnetic cores nor salient poles. Therefore, cogging torque does not occur even in the rotating operation with no current supplied to the coils.

Furthermore, in the present embodiment, the air-core coils are held by the non-magnetic supporting portion 21. Therefore, the magnetic attraction between the magnets and the magnetic members can be made to 0. Accordingly, a state close to an ideal state required in the rotating operation with no current supplied to the coils, which is a so-called torque-free state, can be established.

The combination of the number of air-core coils included in the coil portion 41 and the number of magnets included in the magnet portion 42 is not limited to the combination employed in the present embodiment. Moreover, the plurality of torque-applying coils are not limited to air-core coils and may be, for example, coils each including a non-magnetic core with wires wound therearound, as long as the coils are in the above-described state in terms of magnetic circuit.

Rotary Member

As illustrated in FIG. 5, a bearing 53 is provided on the outer circumferential surface 21a of the supporting portion 21 and above the upper coil holder 43a of the torque-applying unit 40. The inner circumferential surface of the bearing 53 is fixed to the outer circumferential surface 21a. The outer circumferential surface of the bearing 53 is in contact with the inner circumferential surface of the rotary member 50. The rotary member 50 is supported by the bearing 53 in such a manner as to be turnable about the rotation axis AX1.

As illustrated in FIGS. 1 and 2, the rotary member 50 has a cylindrical shape and is provided with the first gear 51 at the lower end thereof. The first gear 51 has teeth projecting outward and is preferably coaxially fixed to the rotary member 50. The rotary member 50 is coaxial with and covers the coil portion 41, the magnet portion 42, and the supporting portion 21.

As illustrated in FIGS. 1A and 1B, the second gear 52 is provided on the first gear 51 and extends along the outer circumferential surface of the rotary member 50. The first gear 51 and the second gear 52 include respective discs having the same radius, and teeth arranged thereon preferably at the same pitch. The second gear 52 is preferably made of a material that provides high slidability, for example, polyacetal.

Figure 8:
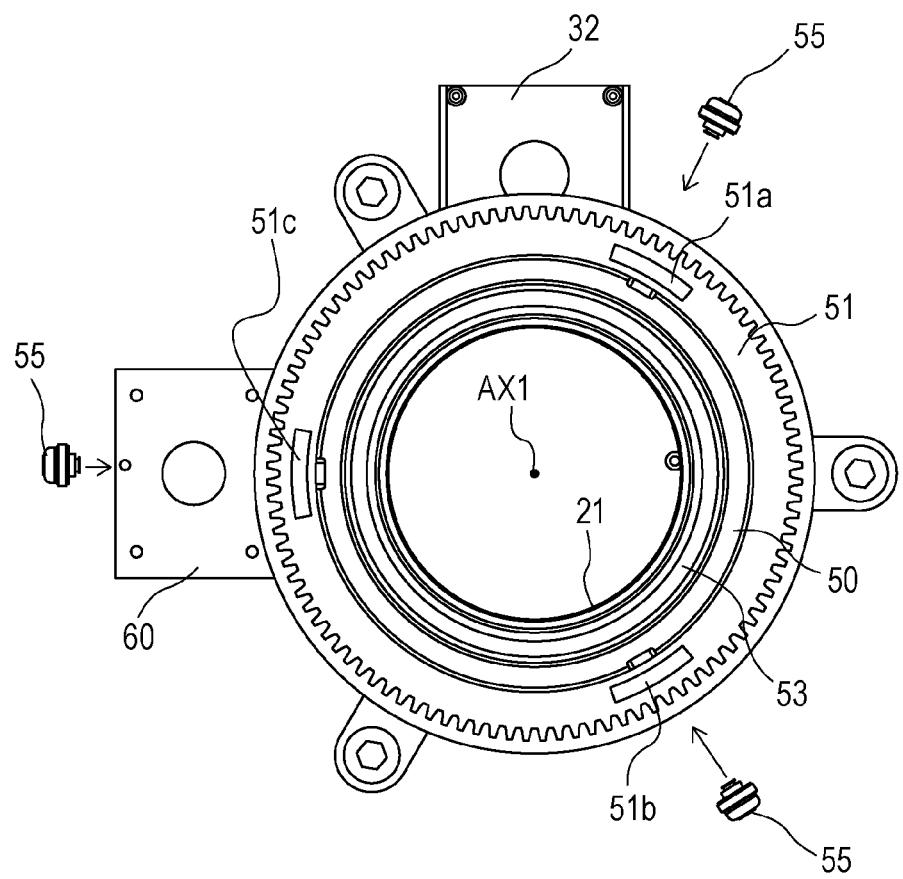
FIG. 8 is a plan view of the input device, with the second gear yet to be attached thereto.
Figure 9:
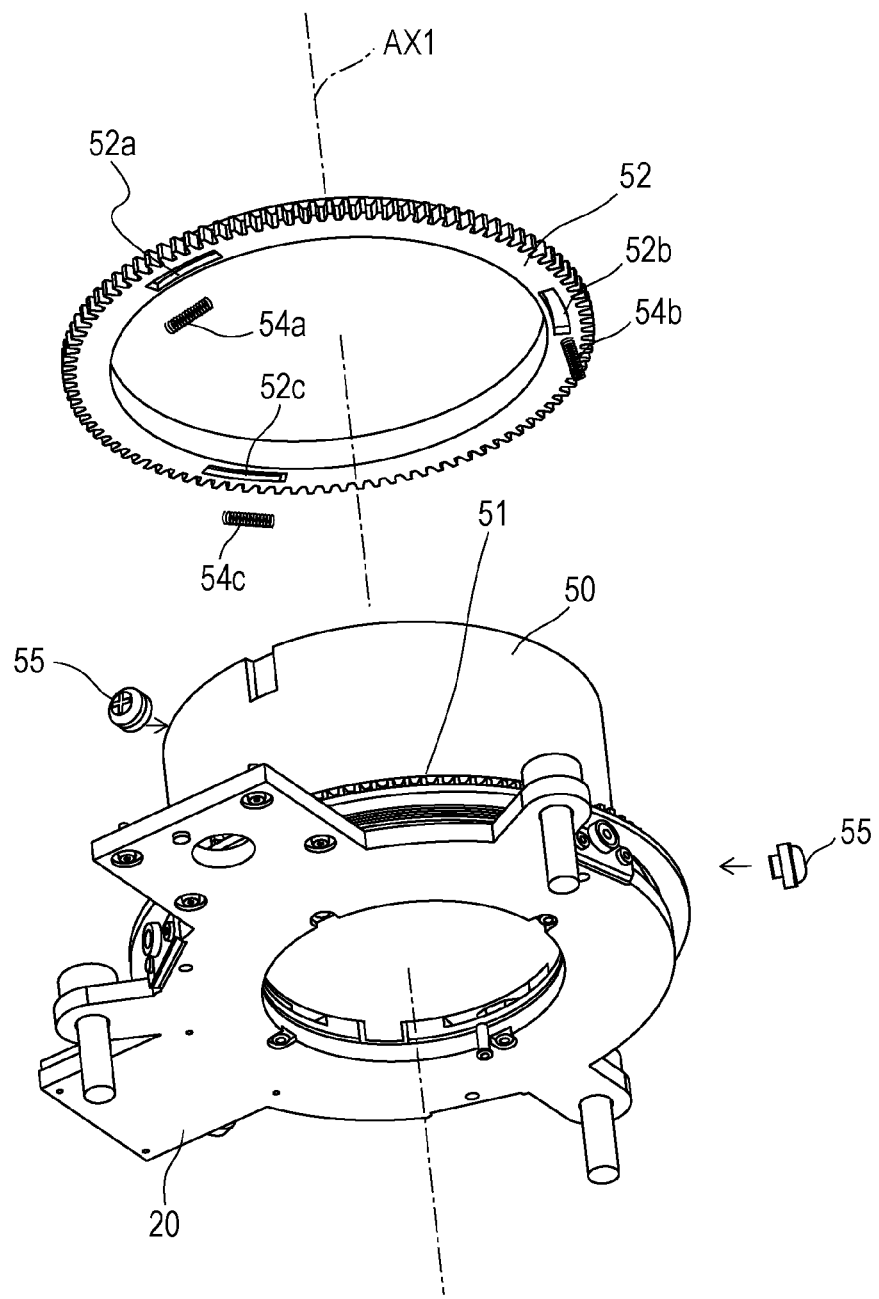
FIG. 9 is a bottom exploded perspective view of the input device, with the second gear separated therefrom.

FIG. 8 is a plan view of the input device 10, with the second gear 52 yet to be attached thereto. FIG. 9 is a bottom exploded perspective view of the input device 10, with the second gear 52 separated therefrom. In FIGS. 8 and 9, the brake-applying unit 60 and the frame 80 are not illustrated.

As illustrated in FIG. 8, the first gear 51 has three recesses 51a, 51b, and 51c in the upper surface thereof. The recesses 51a, 51b, and 51c are arranged at regular angular intervals about the rotation axis AX1 and each extend in a circumferential direction 50c. Likewise, as illustrated in FIG. 9, the second gear 52 has three recesses 52a, 52b, and 52c in the lower surface thereof. The recesses 52a, 52b, and 52c are arranged at regular angular intervals about the rotation axis AX1 and each extend in the circumferential direction 50c. The second gear 52 is placed on the first gear 51 such that the recesses 52a, 52b, and 52c meet the recesses 51a, 51b, and 51c, respectively, of the first gear 51.

When the second gear 52 is placed on the first gear 51, one end of a first spring 54a (FIG. 9) is attached to a position in the recess 51a of the first gear 51, and the other end of the first spring 54a is attached to a position in the recess 52a of the second gear 52. Likewise, one end of a second spring 54b (FIG. 9) is attached to a position in the recess 51b of the first gear 51, and the other end of the second spring 54b is attached to a position in the recess 52b of the second gear 52. Furthermore, one end of a third spring 54c (FIG. 9) is attached to a position in the recess 51c of the first gear 51, and the other end of the third spring 54c is attached to a position in the recess 52c of the second gear 52. Thus, the three springs 54a, 54b, and 54c are positioned between the first gear 51 and the second gear 52 in such a manner as to extend in the circumferential direction 50c of the rotary member 50. The springs 54a, 54b, and 54c are each a compression spring and exert an elastic force (reaction force), with which the second gear 52 is urged in the circumferential direction 50c of the rotary member 50.

The length of compression of the three springs 54a, 54b, and 54c is easily adjustable by displacing the second gear 52 with respect to the first gear 51 and is therefore arbitrarily settable in accordance with the specifications of the input device 10. The number of springs is not limited to three and may be increased or decreased, so that the elastic force (reaction force) exerted by the springs can be changed easily.

As illustrated in FIG. 3, an annular elastic plate 56 is provided on the bottom surface of the first gear 51 and extends along the outer edge of the first gear 51. The encoder disc 31, which has an annular shape, is provided on the inner side with respect to the elastic plate 56. When the rotary member 50, the first gear 51, and the second gear 52 are attached to the fixed unit 20, the fixed unit 20 and the first gear 51 can be spaced apart from each other to some extent because of the presence of the elastic plate 56. Therefore, the wear of the encoder disc 31, the first gear 51, and the fixed unit 20 that may occur with the rotation of the rotary member 50 about the rotation axis AX1 can be suppressed.

The encoder disc 31 has an annular shape extending in the circumferential direction 50c of the rotary member 50 and includes reflective parts and non-reflective parts arranged alternately in a circumferential direction thereof. When the rotary member 50 rotates about the rotation axis AX1, the encoder disc 31 rotates along with the first gear 51.

The rotation-detecting unit 30 includes the encoder disc 31 described above, a detecting substrate 32 fixed to the fixed unit 20, and a detecting device 33 provided on the detecting substrate 32 (see FIGS. 5 and 6).

The detecting device 33 includes a light-emitting device and a light-receiving device. The light-emitting device emits detection light toward a predetermined area of the encoder disc 31 attached to the fixed unit 20. The light-receiving device receives light reflected by the reflective parts of the encoder disc 31. In accordance with the result of the detection of the light, the rotation angle of the rotary member 50 provided with the encoder disc 31 and the first gear 51 is detected. The result of the detection is outputted to the control unit 90.

The rotary member 50, the first gear 51, and the second gear 52 configured as above are attached to the fixed unit 20 in such a manner as to cover the coil portion 41, the magnet portion 42, and the supporting portion 21. As illustrated in FIGS. 1A and 1B, with the rotary member 50 attached as above, three screws 55 are inserted into the rotary member 50 in a radial direction 50r at respective positions defined at regular angular intervals in the circumferential direction 50c. The tips of the screws 55 are screwed into the outer circumferential surface of the magnet portion 42. Thus, the rotary member 50 and the magnet portion 42 are fixed to each other. Therefore, when the rotary member 50 is rotated about the rotation axis AX1, the magnet portion 42 also rotates. When the magnet portion 42 is rotated by supplying current to the air-core coils of the coil portion 41, a corresponding rotational force is transmitted to the rotary member 50. Thus, a driving torque is applied to the rotary member 50.

As illustrated in FIG. 1A, the three screws 55 are positioned in contact, in the vertical direction, with an upper surface 52d of an inner circumferential part of the second gear 52. Therefore, the second gear 52 is restrained in the vertical direction but is turnable in the circumferential direction 50c against the elastic force exerted by the three springs 54a to 54c described above.

Brake-Applying Unit

Figure 10:
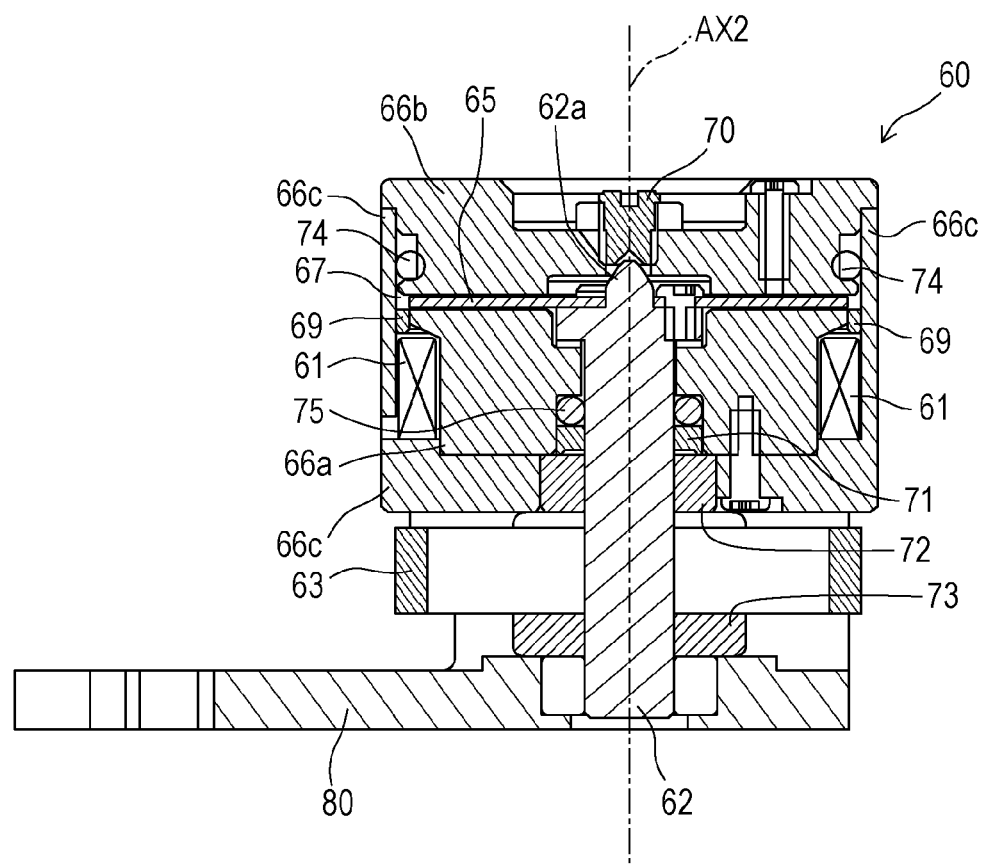
FIG. 10 is a sectional view of a brake-applying unit taken along a rotation axis.
Figure 11:
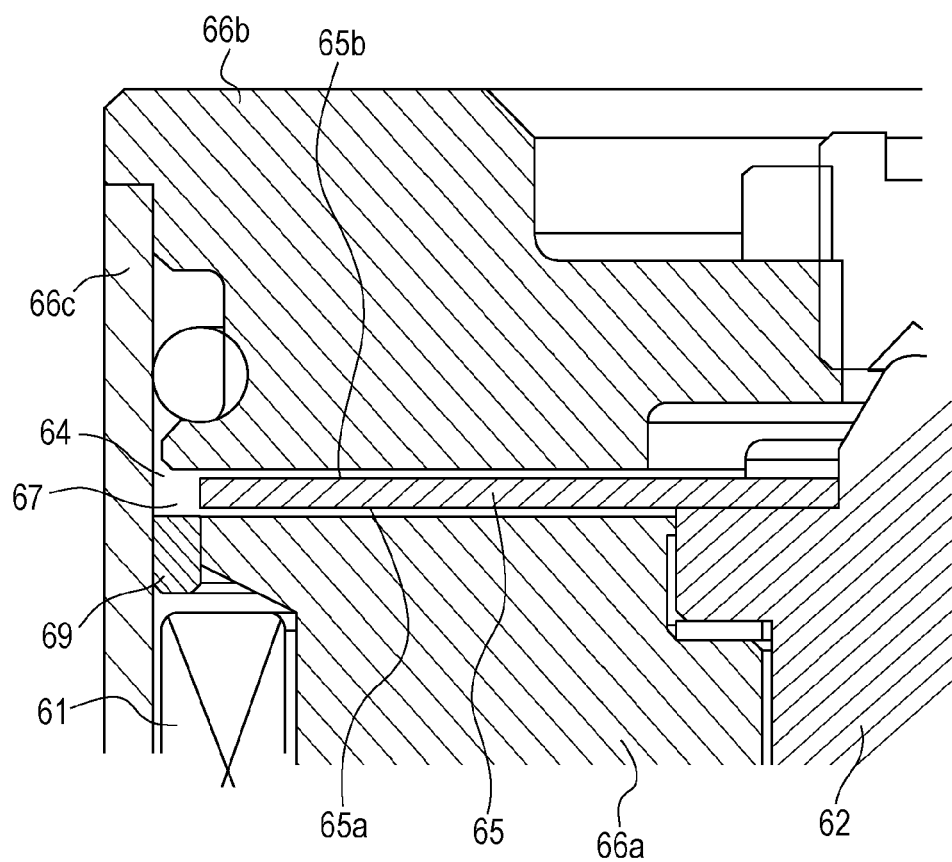
FIG. 11 is an enlargement of part of FIG. 10.
Figure 12:
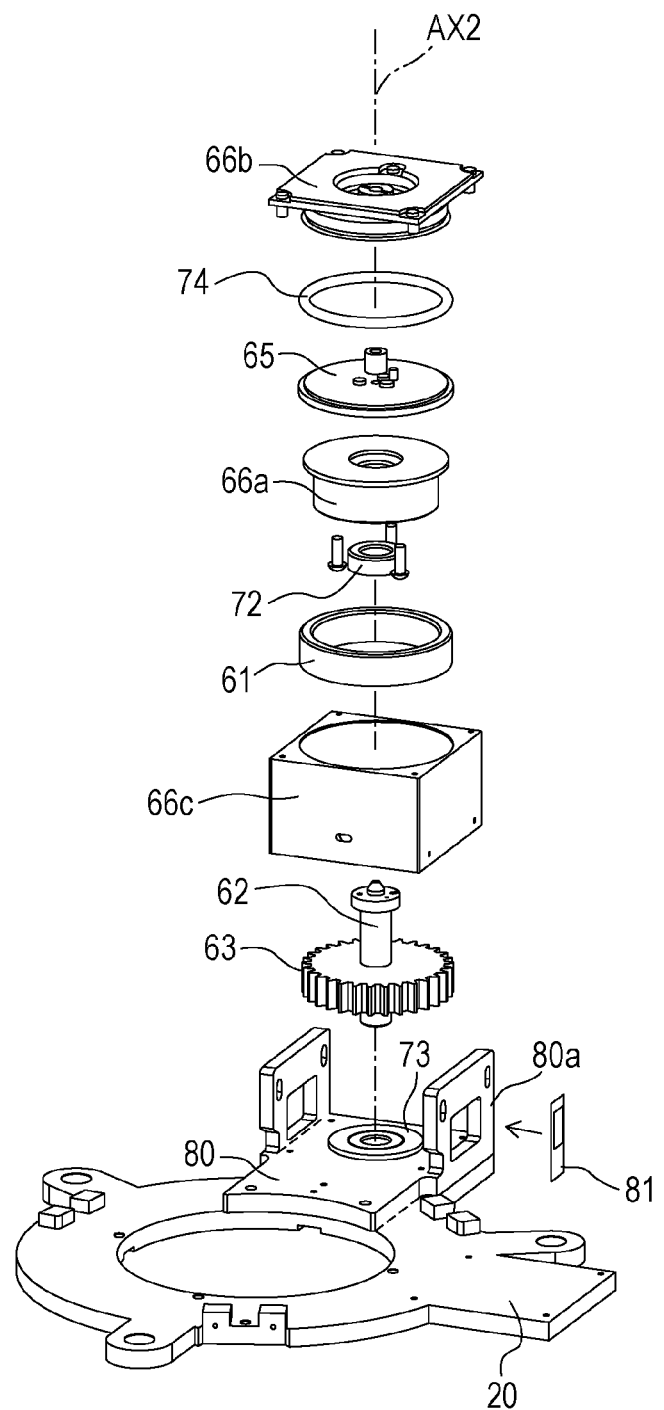
FIG. 12 is a partially exploded perspective view illustrating a relationship between the brake-applying unit and a frame.
Figure 13:
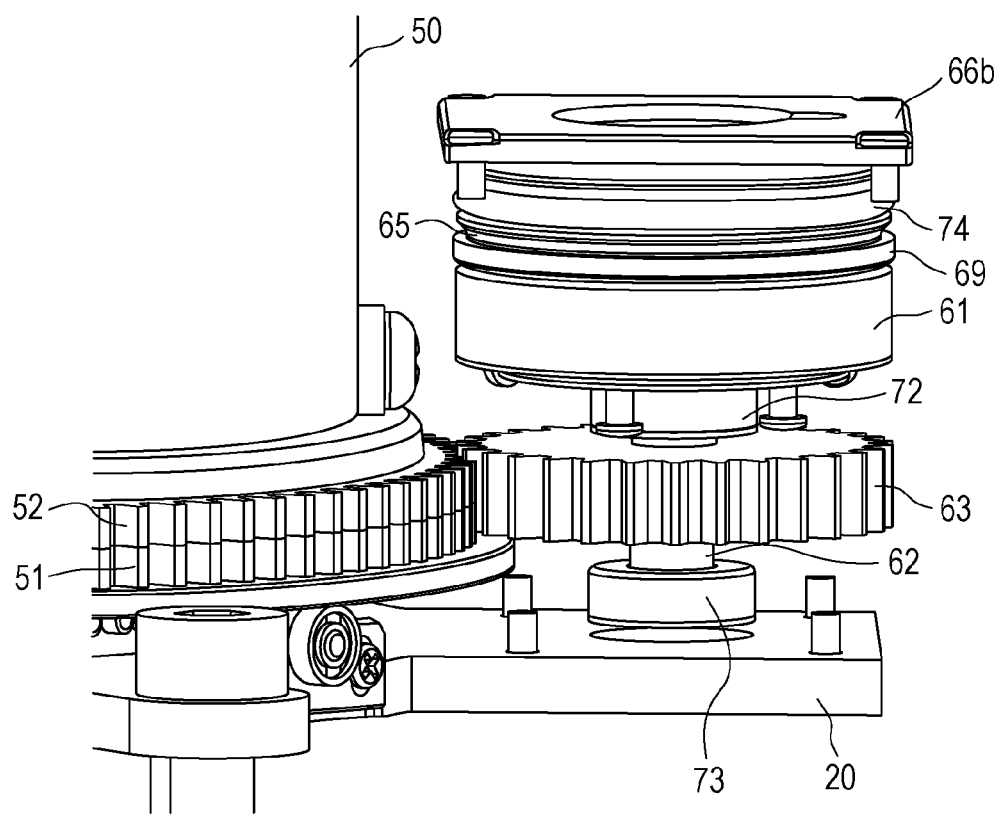
FIG. 13 is a perspective view illustrating a state where a transmission gear is in mesh with the first gear and with the second gear.

FIG. 10 is a sectional view of the brake-applying unit 60 and the frame 80 taken along a rotation axis AX2. FIG. 11 is an enlargement of part of FIG. 10. FIG. 12 is a partially exploded perspective view illustrating a relationship between the brake-applying unit 60 and the frame 80. FIG. 13 is a perspective view illustrating a state where a transmission gear 63 is in mesh with the first gear 51 and with the second gear 52. In FIG. 13, a third yoke 66c, magnetorheological fluid 64, and the frame 80 are not illustrated.

As illustrated in FIG. 10, the brake-applying unit 60 includes a holding portion (a housing) and a movable portion (movable members).

The movable portion includes a shaft 62, the transmission gear 63, and preferably a rotary plate 65 and is rotatable about the rotation axis AX2 of the brake-applying unit 60. As illustrated in FIG. 13, the transmission gear 63 included in the movable portion is in mesh with the first gear 51 and the second gear 52, whereby a braking force based on the rotation of the transmission gear 63 is transmitted toward the rotary member 50. In a state where the brake-applying unit 60 is attached to the fixed unit 20 with the frame 80 interposed therebetween, the rotation axis AX2 of the brake-applying unit 60 is parallel to the rotation axis AX1 of the rotary member 50 and extends in the vertical direction. As illustrated in FIGS. 1A and 1B, in the state where the brake-applying unit 60 is attached to the fixed unit 20, the brake-applying unit 60 including the shaft 62 is positioned on the outer side with respect to the rotary member 50 in the radial direction 50r of the rotary member 50. As described above, in plan view, that is, when seen in the vertical direction, the brake-applying unit 60 that generates a braking force is positioned on the outer side with respect to a rotary mechanism including the rotary member 50 and the torque-applying unit 40. Hence, wires for the brake-applying unit 60 do not need to be laid inside the rotary mechanism. Accordingly, the configuration of the rotary mechanism can be simplified, and the size of the input device 10 in the direction of the rotation axis AX1, i.e. the drive axis, can be reduced.

The movable portion includes the shaft 62, the transmission gear 63, and the rotary plate 65 coaxially connected to the shaft 62, all of which are connected to one another in such a manner as to be rotatable as a whole about the rotation axis AX2. As illustrated in FIG. 10, the movable portion is rotatably supported by the holding portion with the aid of a supporting member 70, radial bearings 72 and 73, and a pusher 71. The shaft 62 is supported by the frame 80 with the aid of the radial bearing 73. The frame 80 is fixed to the fixed unit 20, as illustrated in FIGS. 1A and 1B and others, with adhesive or the like. A gap 67 in which the rotary plate 65 is positioned is preferably filled with the magnetorheological fluid 64.

The holding portion includes a brake-applying coil 61 and a spacer 69, and preferably first to third yokes 66a, 66b, and 66c. As illustrated in FIGS. 1 and 12, the third yoke 66c is fixed to the frame 80, whereby the brake-applying unit 60 is fixed to the frame 80.

Preferably, as illustrated in FIG. 10, in the vertical direction along the rotation axis AX2, the first yoke 66a is positioned on one side with respect to the rotary plate 65 and the second yoke 66b is positioned on the other side with respect to the rotary plate 65. The third yoke 66c is positioned on the outer side with respect to the rotary plate 65. The third yoke 66c is positioned on the outer side with respect to the second yoke 66b with a non-magnetic O-ring 74 interposed therebetween and on the outer side with respect to the first yoke 66a with the spacer 69, which has a ring shape, interposed therebetween. The spacer 69 is made of a non-magnetic material and is placed on the brake-applying coil 61 in such a manner as to overlap therewith. Thus, the position of the brake-applying coil 61 in the vertical direction is determined. The three yokes 66a, 66b, and 66c are arranged coaxially about the rotation axis AX2 in such a manner as to surround the brake-applying coil 61. As illustrated in FIG. 10, the second yoke 66b and the third yoke 66c are connected to each other in a radial direction thereof. The third yoke 66c and the first yoke 66a are connected to each other in the vertical direction. Thus, a magnetic path surrounding the brake-applying coil 61 is produced.

The three yokes 66a, 66b, and 66c are individually processed and formed. Alternatively, any two or more of the three yokes 66a, 66b, and 66c may be combined to form an integral component.

The brake-applying coil 61, serving as a magnetic-field-generating unit, has an annular shape (see FIGS. 10 and 13). The brake-applying coil 61 is a coil including a conductive wire wound around the rotation axis AX2. The brake-applying coil 61 is supplied with current from the control unit 90 (a control circuit) (FIG. 4) through a connecting member, which is not illustrated. When the current is supplied to the brake-applying coil 61, a magnetic field is generated. Preferably, the current to be supplied is controlled by the control unit 90 in accordance with the result of the detection by the detecting device 33.

As illustrated in FIG. 10, the supporting member 70, which extends in the vertical direction, is fitted in the radial center of the second yoke 66b. A tip 62a of the shaft 62 is rotatably supported by the supporting member 70.

As illustrated in FIGS. 10 and 11, the brake-applying unit 60 has the gap 67. The gap 67 is defined between the lower surface of the second yoke 66b and the upper surfaces of the first yoke 66a and the spacer 69 in the vertical direction and between the third yoke 66c and the shaft 62 in the radial direction. In the gap 67, the rotary plate 65 extends in the radial direction orthogonal to the rotation axis AX2, and the magnetorheological fluid 64 spreads between the rotary plate 65 and the lower surface of the second yoke 66b and between the rotary plate 65 and the upper surface of the first yoke 66a. The rotary plate 65 overlaps the brake-applying coil 61 in the vertical direction along the rotation axis AX2.

The magnetorheological fluid 64 is a substance whose viscosity changes when a magnetic field is applied thereto. The magnetorheological fluid 64 is a fluid composed of, for example, a non-magnetic liquid (solvent) and particles made of a magnetic material (magnetic particles) that are dispersed therein. Preferable examples of the magnetic particles contained in the magnetorheological fluid 64 include iron-based particles containing carbon, and ferrite particles. The iron-based particles containing carbon preferably has a carbon content of, for example, 0.15% or higher. The magnetic particles each preferably have a diameter of, for example, 0.5 μm or greater, more preferably 1 μm or greater. It is desirable to select the solvent and the magnetic particles as the magnetorheological fluid 64 such that the magnetic particles are less likely to settle under the gravitational force. Furthermore, the magnetorheological fluid 64 desirably contains a coupling agent that prevents the settling of the magnetic particles.

As described above, the three yokes 66a, 66b, and 66c are connected to one another in such a manner as to surround the brake-applying coil 61, and the first yoke 66a and the second yoke 66b are positioned across the rotary plate 65 from each other. Therefore, the magnetic field generated by the brake-applying coil 61 is induced to the yokes 66a, 66b, and 66c, whereby a closed-loop magnetic path (magnetic circuit) is formed. In such a configuration, when current is supplied to the brake-applying coil 61, a magnetic field with magnetic flux running around the brake-applying coil 61 is generated. When current in the opposite direction is supplied to the brake-applying coil 61, a magnetic field acting in the opposite direction is generated. For example, magnetic flux running in the direction of the rotation axis AX2 from a side nearer to the first yoke 66a to a side nearer to the second yoke 66b passes through the rotary plate 65 provided in the gap 67. That is, the magnetic flux (the magnetic field) passes through the rotary plate 65 from one side (a lower surface 65a) to the other side (an upper surface 65b). The magnetic flux advances through the second yoke 66b chiefly in a direction away from the rotation axis AX2 and reaches the third yoke 66c. Then, on the radially outer side with respect to the brake-applying coil 61, the magnetic flux advances in the direction of the rotation axis AX2 from the upper side toward the lower side.

As illustrated in FIG. 12, the second yoke 66b has a substantially rectangular plan-view shape. Therefore, wide spaces are provided on the outer side with respect to the brake-applying coil 61 particularly at the corners of the plan-view shape. Thus, a wide magnetic path running in the direction of the rotation axis AX2 from the upper side toward the lower side is provided. The second yoke 66b having the substantially rectangular plan-view shape also contributes to an increase in the ease of assembling of the brake-applying unit 60.

The magnetic flux advancing in the direction of the rotation axis AX2 from the upper side toward the lower side on the radially outer side with respect to the brake-applying coil 61 reaches and advances through the third yoke 66c toward the rotation axis AX2 to an area on the inner side with respect to the brake-applying coil 61. Then, the magnetic flux advances through the first yoke 66a from the lower side toward the upper side, passes through the rotary plate 65 again, and reaches the second yoke 66b. Note that since the second yoke 66b and the third yoke 66c each have a substantially rectangular contour in plan view, a wide space is provided on the outer side with respect to the brake-applying coil 61 particularly at the corners of the plan-view shape. Thus, a wide magnetic path extending in the direction of the rotation axis AX2 from the lower side toward the upper side is provided.

In such a magnetic path, the spacer 69 and the O-ring 74 that are made of non-magnetic materials are positioned above the brake-applying coil 61. Therefore, a magnetic gap is produced. In an area near the magnetic gap, the magnetic flux of the magnetic field generated by the brake-applying coil 61 is prevented from advancing in the radial direction orthogonal to the rotation axis AX2. Therefore, the magnetic flux advancing on the inner side with respect to the brake-applying coil 61 from the lower side toward the upper side assuredly passes through the rotary plate 65 to an upper part of the second yoke 66b. Furthermore, on the outer side with respect to the brake-applying coil 61, the magnetic flux assuredly passes through the third yoke 66c from the upper side toward the lower side.

Now, a configuration of the movable portion will be described.

As illustrated in FIG. 10, the shaft 62 has a bar-like shape extending in the direction of the rotation axis AX2. The rotary plate 65 has a disc shape having a flat circular surface orthogonal to the rotation axis AX2 and is made of a magnetic material. The rotary plate 65 is fixed to the shaft 62.

As illustrated in FIG. 10, the shaft 62 is rotatably supported by the radial bearings 72 and 73. The tip 62a, which is on the upper side of the shaft 62, is pivotably supported by the supporting member 70. The upper radial bearing 72 is urged downward by the pusher 71. The pusher 71 is supported by an O-ring 75 provided between the outer circumferential surface of the shaft 62 and the inner circumferential surface of the first yoke 66a such that the vertical position thereof is retained. Thus, the radial bearing 72 is supported at a predetermined position in the direction of the rotation axis AX2. Furthermore, a lower part of the shaft 62 is rotatably supported by the radial bearing 73, which is fixed to the frame 80.

When current is supplied from the control unit 90 to the brake-applying coil 61, a magnetic field described above is generated such that the magnetic flux thereof runs through the rotary plate 65 in the vertical direction. The density of the magnetic flux running through the rotary plate 65 in the radial direction is extremely low.

In the magnetorheological fluid 64, when no magnetic field is generated by the brake-applying coil 61, the magnetic particles are dispersed in the solvent. Therefore, no braking torque acts on the rotary plate 65, and substantially no braking force is applied to the first gear 51 and the second gear 52, which are in mesh with the transmission gear 63 connected to the shaft 62. Hence, the operator can rotate the rotary member 50 without receiving a large braking force from the brake-applying unit 60.

On the other hand, when current is supplied to the brake-applying coil 61 to generate a magnetic field, a magnetic field acting in the vertical direction is applied to the magnetorheological fluid 64. With such a magnetic field, the magnetic particles dispersed in the magnetorheological fluid 64 gather along the lines of magnetic force, and the magnetic particles aligned in the vertical direction are magnetically bonded to one another. In such a state, a drag (a braking torque) exerted by the bonded magnetic particles acts on the rotary plate 65. Accordingly, a braking force is applied from the transmission gear 63 connected to the shaft 62 to the first gear 51 and the second gear 52 that are in mesh with the transmission gear 63. Hence, when the rotary member 50 is rotated, the operator can sense a greater drag than in a case where no magnetic field is generated. If the current to be supplied to the brake-applying coil 61 is controlled in such a manner as to change the intensity of the magnetic field, the drag sensed by the operator can be increased or decreased with the increase or decrease in the braking torque. Accordingly, the tactile sense of operation can be changed. Thus, not only the variable control of the driving torque generated by the torque-applying unit 40 but also the variable control of the braking force to a desired level in accordance with the braking torque generated by the brake-applying unit 60 is realized. Therefore, various tactile senses of operation can be given to the operator who operates the rotary member 50.

When the rotation angle detected by the detecting device 33 has reached a predetermined angle, the control unit 90 supplies a predetermined current to the brake-applying coil 61. A braking torque generated in this process applies a strong braking force from the transmission gear 63 to the first gear 51 and the second gear 52 that are in mesh with the transmission gear 63. Accordingly, the operator who operates the rotary member 50 receives a tactile sense of operation resembling a sense of bumping against a virtual wall and thus being stopped (an end-stop state).

As described above, the second gear 52 is urged in the circumferential direction 50c of the rotary member 50 by the elastic force exerted by the springs 54a, 54b, and 54c. Some play for meshing is provided between the transmission gear 63 and the first gear 51 that is in mesh therewith and between the transmission gear 63 and the second gear 52 that is in mesh therewith. The teeth of the first gear 51 and the teeth of the second gear 52 are in mesh with the transmission gear 63 at respective pitches, which are preferably staggered in the circumferential direction 50c. In the end-stop state, when it is attempted to rotate the rotary member 50 in the direction for establishing the end-stop state, the pitch staggering between the teeth of the first gear 51 and the teeth of the second gear 52 is slight or none because the first gear 51 and the second gear 52 are under a strong braking force. When the rotary member 50 is rotated in a direction for disabling the end-stop state or when the force of operating the rotary member 50 is reduced, the pitch staggering is resumed by the elastic force exerted by the springs 54a, 54b, and 54c. Thus, backlash can be reduced.

The end-stop state is disabled in accordance with the result of the detection by the strain gauge 81 provided on the frame 80. As illustrated in FIGS. 1A and 1B, the strain gauge 81 is provided on one of a pair of vertical sidewalls 80a of the frame 80 to which the brake-applying unit 60 is fixed. The strain gauge 81 detects strain occurring in the frame 80 and outputs the result of the detection to the control unit 90. As described above, the frame 80 is fixed to the fixed unit 20. Therefore, in the end-stop state where a strong braking force is applied, when it is attempted to further rotate the rotary member 50 in the direction for establishing the end-stop state, a force is transmitted from the first gear 51 and the second gear 52 through the transmission gear 63 to the frame 80, whereby a strain occurs in the frame 80. On the other hand, when the force of operating the rotary member 50 is reduced in the end-stop state, the strain in the frame 80 is reduced. When the rotary member 50 is operated in the opposite direction, the strain in the frame 80 is eliminated. If the end-stop state is not disabled, a strain in the opposite direction occurs in the frame 80. In such a case, if the result of the detection by the strain gauge 81 exceeds a predetermined value, the control unit 90 reduces the current supplied to the brake-applying coil 61, thereby disabling the end-stop state. Therefore, the operator of the rotary member 50 receives no tactile sense of being stopped.

In the present embodiment, only one strain gauge 81 is provided. If two or more strain gauges 81 are provided, the strain occurring in the frame 80 can be detected more precisely.

The above embodiment configured as above produces the following advantageous effects.

(1) No wires need to be provided inside the rotary mechanism including the rotary member 50 and the torque-applying unit 40. Therefore, the configuration of the rotary mechanism can be simplified, realizing an input device whose size can be reduced in the direction of the rotation axis AX1, i.e. the drive axis, of the rotary member 50.

(2) If the current to be supplied to the air-core coils of the coil portion 41 is controlled, a driving torque for rotation can be applied to the rotary member 50. Furthermore, if the air-core coils are held by the non-magnetic supporting portion, the change in the magnetic attraction that occurs with the change in the relative positions of the magnets can be reduced.

(3) If the brake-applying unit 60 configured as above enable not only the variable control of the driving torque generated by the torque-applying unit 40 but also the variable control of the braking force to a desired level in accordance with the braking torque, various tactile senses of operation can be given to the operator who operates the rotary member 50.

(4) If the first gear 51 and the second gear 52 have teeth arranged at respective pitches equal to each other and are urged in the circumferential direction 50c such that the pitches thereof are staggered, backlash at the removal of the braking force applied to the rotary member 50 or in any other like situation can be reduced.

(5) If the strain gauge 81 that detects strain in the frame 80 is provided on the frame 80 that connects the fixed unit 20 and the brake-applying unit 60 to each other, the braking force applied to the rotary member 50 can be removed in accordance with the result of the detection by the strain gauge 81. If the strain gauge 81 is only pasted to the outer surface of the frame 80 with adhesive or the like, a device that is easy to manufacture can be provided. Furthermore, the wiring for the strain gauge 81 can be simplified. Consequently, the size of the input device 10 in the direction of the rotation axis AX2 can be reduced.

(6) Since the torque of the rotary member 50 as an operating portion is directly controllable, an input device providing an excellent tactile sense of operation is realized.

(7) Since the rotary member 50, the torque-applying unit 40, the supporting portion 21, and the opening 22 of the fixed unit 20 define a hollow space that is continuous in the vertical direction, a functional component such as a component that emits light can be provided in the space.

While the present invention has been described with reference to the above embodiment, the present invention is not limited to the above embodiment. Any improvements or changes can be made thereto within the scope of the object of improvement or the spirit of the present invention.

INDUSTRIAL APPLICABILITY

As described above, the input device according to the present invention is advantageous in terms of realizing a simple configuration of a rotary mechanism and a size reduction in the drive-axis direction.

What is claimed is:

1. An input device comprising:
    a fixed unit;
    a rotary member rotatably supported by the fixed unit;
    a rotation-detecting unit that detects a rotation angle of the rotary member;
    a brake-applying unit that applies a braking force to the rotary member;
    a torque-applying unit that applies a driving torque to the rotary member; and
    a control unit that controls the brake-applying unit and the torque-applying unit,
    wherein the brake-applying unit includes:
       magnetorheological fluid;
       a brake-applying coil that applies a magnetic field to the magnetorheological fluid;
       a shaft to which braking torque that changes with viscosity of the magnetorheological fluid is applied; and
       a transmission gear provided on the shaft, the transmission gear being in mesh with a gear provided on the rotary member,
    wherein the shaft is positioned on an outer side with respect to the rotary member in a radial direction of the rotary member,
    wherein the fixed unit is made of a non-magnetic material and includes a cylindrical supporting portion extending in a direction of a rotation axis of the rotary member,
    wherein the torque-applying unit includes:
       a plurality of torque-applying coils arranged in a circumferential direction of an outer circumferential surface of the supporting portion; and
       a magnet that faces the plurality of torque-applying coils with an interval, the magnet being annular and provided on an outer side with respect to the plurality of torque-applying coils,
    wherein the magnet is positioned on an inner side with respect to the rotary, member and rotates along with the rotary member, and
    wherein the control unit controls current to be supplied to the plurality of torque-applying coils, the current being controlled in accordance with the rotation angle of the rotary member.

2. The input device according to claim 1,
    wherein the brake-applying unit includes a rotary plate connected to the shaft, and a yoke that induces the magnetic field generated by the brake-applying coil,
    wherein the yoke faces one side of the rotary plate and the other side of the rotary plate with respective gaps in between such that the magnetic field passes through the rotary plate from the one side to the other side,
    wherein the magnetorheological fluid is provided in the gaps, and
    wherein the control unit controls current to be supplied to the brake-applying coil, the current being controlled in accordance with the rotation angle of the rotary member.

3. The input device according to claim 1,
    wherein the gear includes a first gear and a second gear,
    wherein the first gear is fixed to the rotary member, and
    wherein the second gear has teeth arranged at a pitch equal to a pitch of teeth of the first gear, the second gear being urged in a circumferential direction such that the pitches are staggered.

4. The input device according to claim 1, further comprising:
    a frame that connects the fixed unit and the brake-applying unit to each other; and
    a strain gauge that detects strain occurring in the frame.

5. An input device comprising:
    a fixed unit;
    a rotary member rotatably supported by the fixed unit;
    a rotation-detecting unit that detects a rotation angle of the rotary member;
    a brake-applying unit that applies a braking force to the rotary member;
    a torque-applying unit that applies a driving torque to the rotary member;
    a control unit that controls the brake-applying unit and the torque-applying unit;

a frame that connects the fixed unit and the brake-applying unit to each other, the frame having a pair of vertical sidewalls to which the brake-applying unit is fixed; and a strain gauge that detects strain occurring in the frame, wherein the brake-applying unit includes:

magnetorheological fluid;

a brake-applying coil that applies a magnetic field to the magnetorheological fluid;

a shaft to which braking torque that changes with viscosity of the magnetorheological fluid is applied; and a transmission gear provided on the shaft, the transmission gear being in mesh with a gear provided on the rotary member, wherein the shaft is positioned on an outer side with respect to the rotary member in a radial direction of the rotary member, and wherein the strain gauge is provided on one of the pair of vertical sidewalls of the frame.

6. The input device according to claim 5, wherein the fixed unit is made of a non-magnetic material and includes a cylindrical supporting portion extending in a direction of a rotation axis of the rotary member, wherein the torque-applying unit includes:

a plurality of torque-applying coils arranged in a circumferential direction of an outer circumferential surface of the supporting portion; and a magnet that faces the plurality of torque-applying coils with an interval, the magnet being annular and provided on an outer side with respect to the plurality of torque-applying coils, wherein the magnet is positioned on an inner side with respect to the rotary member and rotates along with the rotary member, and wherein the control unit controls current to be supplied to the plurality of torque-applying coils, the current being controlled in accordance with the rotation angle of the rotary member.

7. The input device according to claim 5, wherein the brake-applying unit includes a rotary plate connected to the shaft, and a yoke that induces the magnetic field generated by the brake-applying coil, wherein the yoke faces one side of the rotary plate and the other side of the rotary plate with respective gaps in between such that the magnetic field passes through the rotary plate from the one side to the other side, wherein the magnetorheological fluid is provided in the gaps, and wherein the control unit controls current to be supplied to the brake-applying coil, the current being controlled in accordance with the rotation angle of the rotary member.

8. The input device according to claim 5, wherein the gear includes a first gear and a second gear, wherein the first gear is fixed to the rotary member, and wherein the second gear has teeth arranged at a pitch equal to a pitch of teeth of the first gear, the second gear being urged in a circumferential direction such that the pitches are staggered.

* * * * *